(12) United States Patent
Heusinger

(10) Patent No.: US 10,850,761 B2
(45) Date of Patent: Dec. 1, 2020

(54) INDUSTRIAL TRUCK

(71) Applicant: Jungheinrich Aktiengesellschaft, Hamburg (DE)

(72) Inventor: Sebastian Heusinger, Hamburg (DE)

(73) Assignee: Jungheinrich Aktiengesellschaft, Hamburg (DE)

( * ) Notice: Subject to any disclaimer, the term of this patent is extended or adjusted under 35 U.S.C. 154(b) by 38 days.

(21) Appl. No.: 16/253,752

(22) Filed: Jan. 22, 2019

(65) Prior Publication Data

US 2019/0225253 A1 Jul. 25, 2019

(30) Foreign Application Priority Data

Jan. 24, 2018 (DE) .......................... 10 2018 101 538

(51) Int. Cl.
| | | |
|---|---|---|
| *B62D 1/184* | (2006.01) | |
| *B60K 37/06* | (2006.01) | |
| *B62D 1/22* | (2006.01) | |
| *B62D 1/18* | (2006.01) | |
| *B66F 9/075* | (2006.01) | |

(52) U.S. Cl.
CPC .............. *B62D 1/184* (2013.01); *B60K 37/06* (2013.01); *B62D 1/18* (2013.01); *B62D 1/22* (2013.01); *B66F 9/0759* (2013.01)

(58) Field of Classification Search
CPC .. B62D 1/184; B62D 1/18; B62D 1/22; B66F 9/0759; B66F 9/07568; B60K 37/06; B60K 35/00
See application file for complete search history.

(56) References Cited

U.S. PATENT DOCUMENTS

| | | | | |
|---|---|---|---|---|
| 3,347,558 A | * | 10/1967 | Grimes .................... | B62D 1/22 280/775 |
| 5,088,571 A | * | 2/1992 | Burry ..................... | B60K 37/00 180/90 |
| 8,405,245 B1 | * | 3/2013 | Clay, II .................. | B60K 37/06 307/10.1 |
| 2005/0050927 A1 | * | 3/2005 | Kapteyn ................ | B60K 37/06 70/237 |

(Continued)

FOREIGN PATENT DOCUMENTS

| | | |
|---|---|---|
| DE | 1128302 A | 4/1962 |
| DE | 6929353 U | 7/1969 |

(Continued)

OTHER PUBLICATIONS

DE 102018101538.0; filed Jan. 24, 2018; German Search Report dated Jan. 17, 2019; 8 pages.

*Primary Examiner* — Drew J Brown
(74) *Attorney, Agent, or Firm* — Barclay Damon LLP

(57) ABSTRACT

An industrial truck comprises a drive system and a steering arrangement. The steering arrangement comprises a steering column having a steering column portion extending along a steering column portion axis. A steering wheel is rotatably mounted on an end of the steering column portion, wherein the steering column portion is configured to adjust the steering wheel relative to a position of a driver. A control unit comprises a display module and is coupled to a portion of the steering column such that the control unit extends from the portion of the steering column along an axis that intersects with the axis of the steering column portion.

11 Claims, 4 Drawing Sheets

(56) References Cited

U.S. PATENT DOCUMENTS

| | | | |
|---|---|---|---|
| 2007/0296195 A1* | 12/2007 | Manwaring | B62D 1/187 |
| | | | 280/775 |
| 2012/0072072 A1* | 3/2012 | Backman | B60Q 1/343 |
| | | | 701/36 |
| 2012/0072103 A1* | 3/2012 | Backman | B60K 35/00 |
| | | | 701/400 |
| 2015/0096405 A1* | 4/2015 | Hoock | B62D 1/18 |
| | | | 74/493 |
| 2016/0046472 A1 | 2/2016 | Gilbride et al. | |
| 2017/0199983 A1* | 7/2017 | Cano | A61J 7/02 |
| 2018/0105407 A1* | 4/2018 | Porter | B62D 6/10 |
| 2019/0276066 A1* | 9/2019 | Heusinger | B62D 1/18 |
| 2019/0278385 A1* | 9/2019 | Heusinger | B60K 35/00 |

FOREIGN PATENT DOCUMENTS

| | | |
|---|---|---|
| DE | 10246012 A1 | 8/2003 |
| DE | 10324128 A1 | 1/2005 |
| DE | 102006031967 A1 | 1/2008 |
| DE | 102008049073 A1 | 4/2010 |

* cited by examiner

INDUSTRIAL TRUCK

CROSS REFERENCE TO RELATED INVENTION

This application is based upon and claims priority to, under relevant sections of 35 U.S.C. § 119, German Patent Application No. 10 2018 101 538.0, filed Jan. 24, 2018, the entire contents of which are hereby incorporated by reference.

BACKGROUND

The invention relates to an industrial truck and specifically to an industrial truck comprising a drive system and a steering arrangement, the steering wheel thereof being able to be actuated from a driver's position.

It is known for ergonomic reasons to adjust the steering wheel of vehicles with the steering column and namely both in the axial direction of the steering column and also in the vertical direction. A locking apparatus which is generally actuated by a lever has to be released before adjusting the steering wheel or, respectively, the steering column and subsequently fixed again after the adjustment.

It is also known to provide a display in an industrial truck for displaying operating situations, said display being fixedly arranged in the manner of a dashboard or instrument panel. A drawback with such an arrangement is that the dashboard impairs the view of the driver to the outside in front of the vehicle. Moreover, the display is removed relatively far from the driver and, therefore, has to be of a certain size so that details may be identified. With a fixed position, the control elements assigned to the display are not ergonomically accessible by all drivers.

BRIEF SUMMARY OF THE INVENTION

The object of the invention is to provide an industrial truck in which a control unit is arranged in an ergonomic position and is easily accessible by the driver.

In an embodiment, a control unit comprises a display and/or an access authorisation module is connected to a steering column portion, which in turn is connected to the steering wheel. The control unit, for example, protrudes laterally from the steering column portion so as not to be concealed by the steering wheel.

The display may, in particular, have a touch-sensitive visual display or a visual display to which additional control elements such as buttons are assigned. The access authorization module permits the access authorization of an operator to be checked, which is verified for example by a key, a code, or an access authorisation card. The control unit comprising the display and/or access authorization module is arranged in this case relatively close to the steering wheel and thus in the vicinity of the driver. If the position of the steering wheel is altered, the position of the control unit is automatically altered. The control unit is also arranged in a space-saving manner and so that it appears to be suspended. Such an arrangement does not interrupt the view to the outside and therefore acts as an improvement to the comfort of the operator. The operator is relieved of stress by reducing movements of the head in order to achieve a view outside the vehicle and fatigue is thus counteracted, which in turn increases safety.

The adjustability of the steering column permits an adjustment of the steering wheel relative to a driver's position of the industrial truck which, depending on the vehicle type, in particular may have a driver's seat or a stand. The driver's position substantially fixes the position of the driver during the operation of the industrial truck. To this end, the driver's position may have a backrest or another surface against which the driver is supported when travelling and/or an apparatus for detecting the presence of the driver ("dead man's button").

According to one embodiment, the control unit has a storage compartment. The storage compartment may be arranged separately on the control unit or may be integrated in the form of a compartment in the housing for the control unit, wherein for example the open side of the compartment is remote from the steering column. Moreover, alternatively or additionally, a pen holder or a holder for a hand-held scanner may be attached to the control unit. The pen and/or hand-held scanner, therefore, are accessible at any time by the driver in a comfortable manner and when setting the steering wheel or, respectively, the steering column, are also adjusted therewith.

According to one embodiment, the portion of the steering column which is connected to the steering wheel and which is adjusted in the known manner together with the steering wheel may be made up of shell parts which are divided in the longitudinal direction, wherein a holding component for the control unit is connected to a shell part. This connection may be designed to be alterable. The control unit may be releasably attached to the steering column portion or, respectively, to the holding component. Thus, for example, it is conceivable to push a housing for the control unit onto the holding component which may have the shape of a frame and to lock the housing releasably thereto in the pushed-on position.

In one embodiment, the access authorization module has a lock, a reading device and/or a code input apparatus. The reading device may be configured, for example, for reading a magnetic strip or a chip of an access authorization card or another transponder.

BRIEF DESCRIPTION OF THE DRAWINGS

The invention is described in more detail hereinafter with reference to the drawings below.

DETAILED DESCRIPTION OF THE INVENTION

Figure 1:
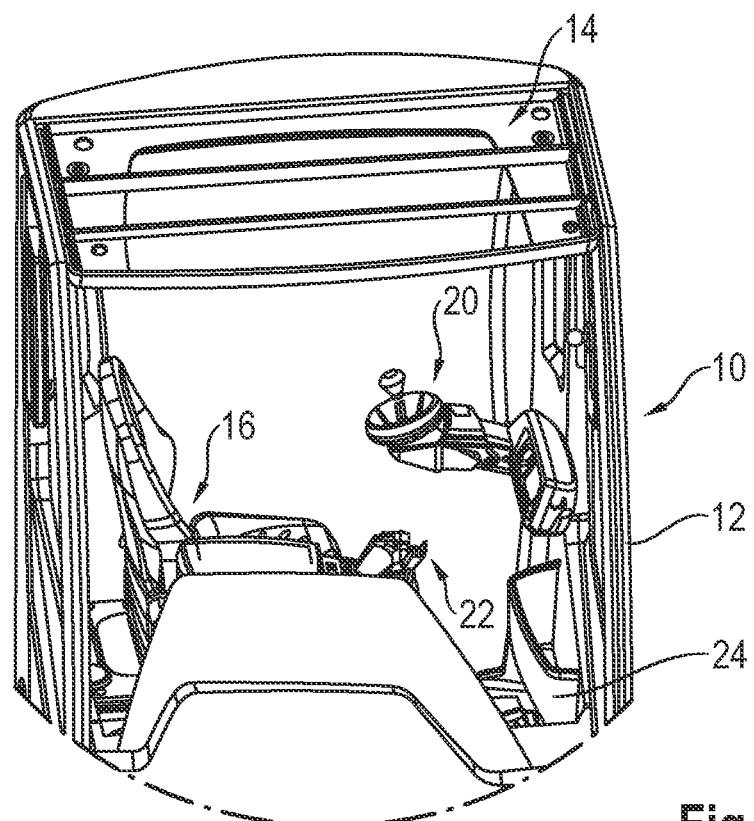
FIG. 1 illustrates a perspective side view of an embodiment of a cab for an industrial truck.
Figure 2:
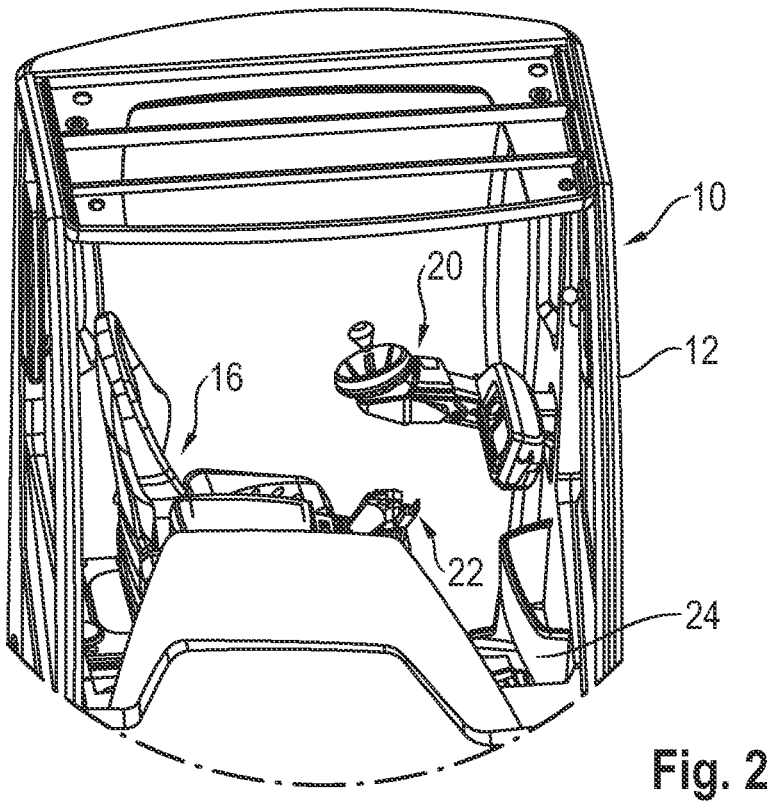
FIG. 2 illustrates the same view as FIG. 1 but with an altered steering wheel position.

A cab 10 for a reach truck is indicated in FIGS. 1 and 2, in which four pillars 12 which are arranged in a rectangle support a driver protection roof 14. The driver's position inside the cab 10 is predetermined by a driver's seat 16. Assigned to the driver's position is a steering arrangement 20, the details thereof being shown in more detail in FIGS.

3 to 6. To the right adjacent to the driver's seat 16 is located a control and monitoring unit 22 of known design for controlling and monitoring the individual operating processes of the industrial truck, not shown further. A storage pocket 24 for objects to be carried is located below the steering arrangement 20.

Figure 3:
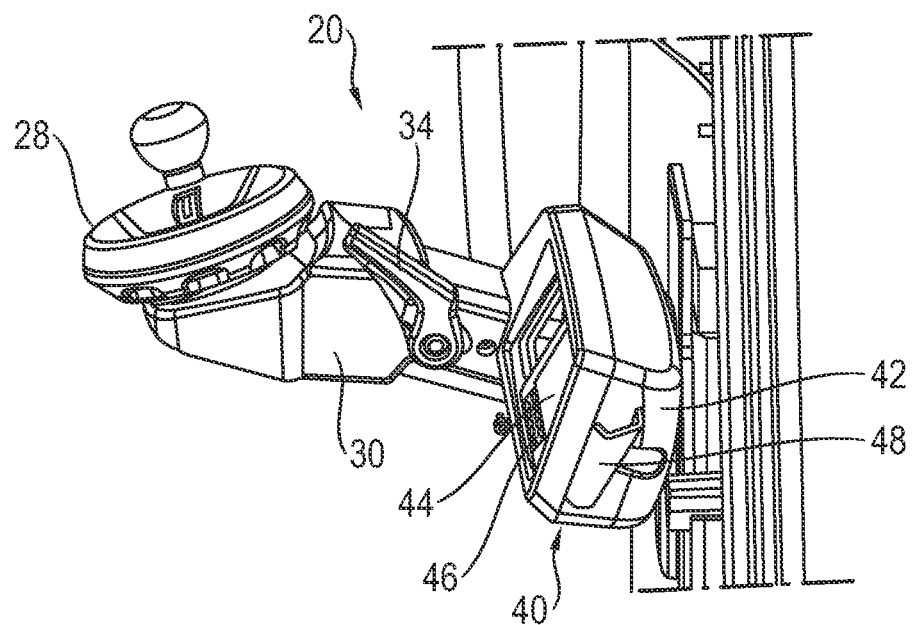
FIG. 3 illustrates an enlarged view of an embodiment of a steering wheel according to FIG. 1 with an embodiment of a control unit comprising a display.
Figure 5:
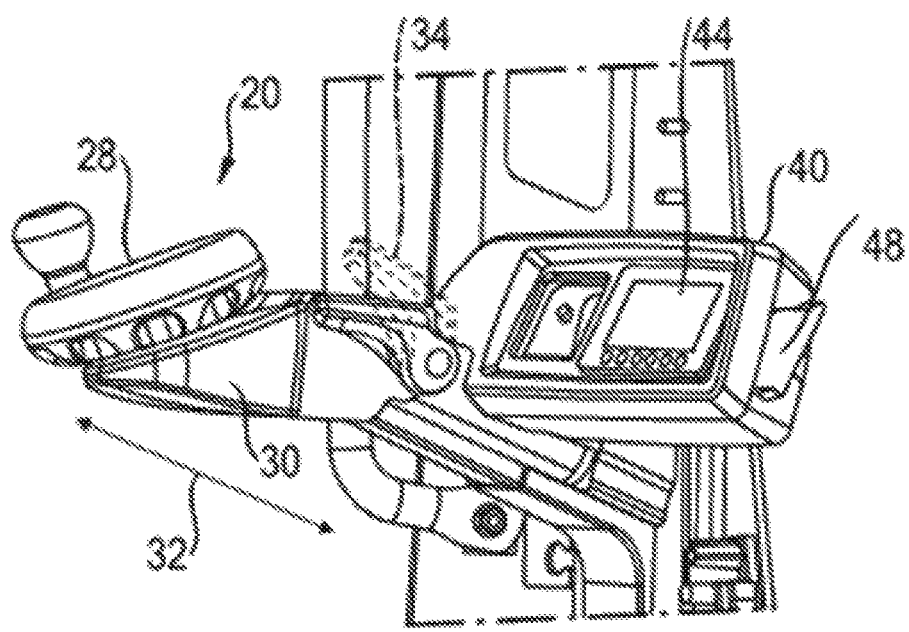
FIG. 5 illustrates a side perspective of the embodiment of FIG. 3 with the unlocked steering column.

Referring to FIG. 3, the steering arrangement 20 has a steering wheel 28 which is mounted in a bearing of the steering column, for steering one or more steerable wheels of the industrial truck. The transmission of the steering angle to the steered wheels takes place via electrical signals which control a steering drive. The steering column portion 30 extends along a steering column portion axis and is movable relative to a fixed steering column portion, which is connected fixedly to the vehicle frame, in the longitudinal direction thereof. Therefore, the steering column portion 30 and thus the steering wheel 28 may be adjusted in the direction of the arrow 32 shown in FIG. 5. Further possibilities for adjustment are not provided in the exemplary embodiment shown but are also conceivable, for example perpendicular to the longitudinal axis of the steering column. For the adjustment, a locking lever 34 which is shown in FIG. 3 in the locked position, has to be moved into the unlocked position as shown in FIG. 5. By gripping the steering wheel the driver may now adjust the position relative to the driver's seat 16. It goes without saying that not only an adjustment in the longitudinal direction is possible but optionally also by tilting from top to bottom or, respectively, bottom to top. The structural design of a steering column in the described manner is known per se. In FIG. 2, the steering wheel is nearer to the driver's seat 16 than in FIG. 1.

Figure 4:
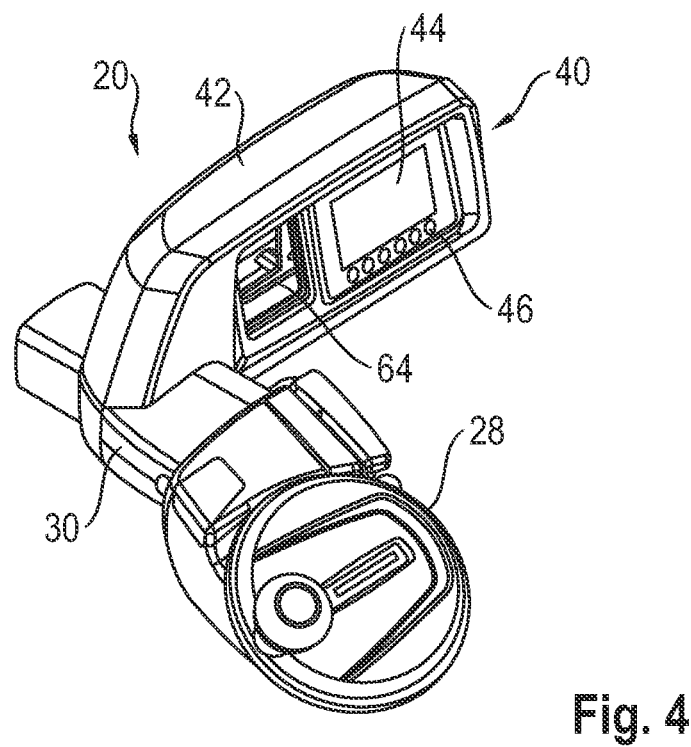
FIG. 4 illustrates a top perspective view of the end of the steering column with the steering wheel and the control unit comprising the display according to FIG. 3.

As may be identified from FIGS. 3 to 5, a control unit 40 is connected to the steering column portion 30. The control unit 40 has a housing 42 which protrudes horizontally to the side from the steering column portion 30 and contains a display 44 with control buttons 46. Moreover, the housing also contains an access authorization module 64 (FIG. 4) on the left-hand side of the display 44 for activating the drive system and/or further functions of the industrial truck, not shown. The access authorization module 64 (FIG. 4) may contain a lock, a start button, a reading device and/or a code input apparatus. Exchanging the positions of the display 44 and the access authorization module 64 (FIG. 4) is conceivable. A pen holder 48 is attached to the side of the housing 42 remote from the steering column portion 30. In the housing 42 is located the electronics system for the actuating buttons 46 and the display 44 as well as the lock, or respectively, the start button or other access authorization.

The functions which are implemented by the control and display unit 40 are known per se. The particularity in the present case is that the control unit 40 is fixedly connected to the adjustable steering column portion 30. This means that the position of the control unit 40 is firstly located in the vicinity of the driver and is secondly able to be set ergonomically together with the steering wheel 28. Both are optimally positioned relative to one another so that the adjustment of the unit results in optimal ergonomic accessibility. The control unit 40 is thus always easily accessible by the driver or, respectively, the display 44 may always be easily read and/or operated. This means reduced stress for the driver and thus the signs of fatigue are counteracted, which is advantageous for safety.

Figure 6:
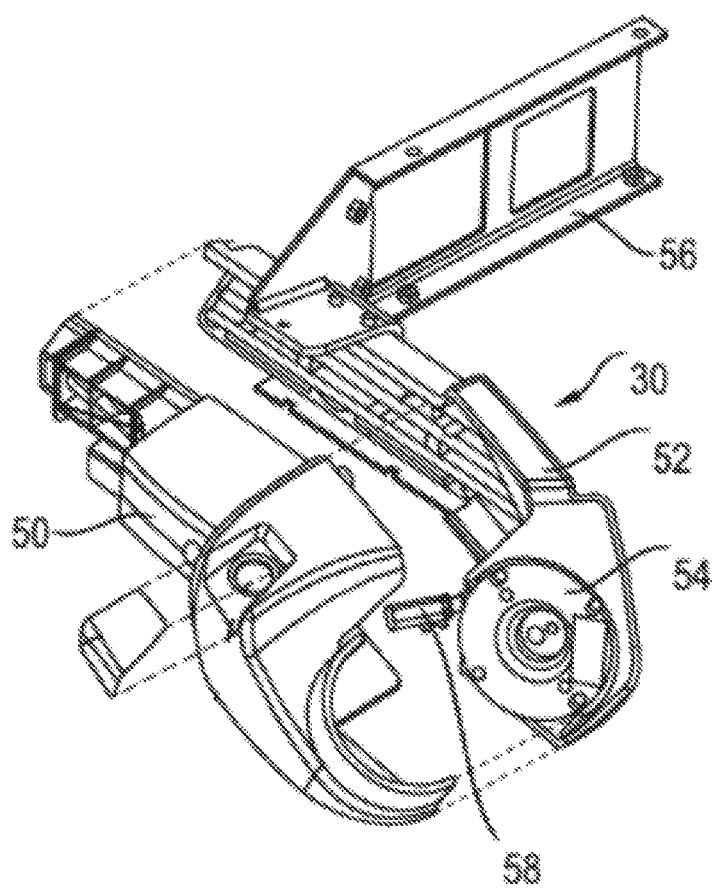
FIG. 6 illustrates a perspective view if an embodiment of shell parts of the steering column portion connected to the steering wheel in an open position with a holding frame for a control unit on the shell part.

In FIG. 6 it may be identified that the steering column portion 30 is made up of two shell portions 50, 52 which are divided in the longitudinal direction and which are connected together in the assembled state as shown in FIGS. 1 to 5, for example by a screwed connection or, respectively, a clamped connection. The shell portion 52 has a bearing 54 for the steering sensor system, or respectively, the steering wheel 28 (FIGS. 1-5). A frame 56 which protrudes horizontally to the side from the shell portion 52 is also connected to the shell portion 52. The frame serves for attaching the housing 42 (FIGS. 3-5) of the control unit 40 (FIGS. 3-5). Thus, for example, the housing may be pushed in a suitable manner onto the frame 56 and screwed thereon in the pushed-on position.

In FIG. 6 a sensor 58 for determining the rotational angle of the steering wheel may be identified.

The invention claimed is:

1. An industrial truck comprising:
a drive system;
a steering arrangement comprising,
a steering column having a steering column portion extending along a steering column portion axis,
a steering wheel rotatably mounted on an end of the steering column portion, wherein the steering column portion is configured to adjust the steering wheel relative to a position of a driver;
a control unit comprising a display module, wherein the control unit is coupled to a portion of the steering column such that the control unit extends from the portion of the steering column along an axis that intersects with the axis of the steering column portion; and wherein the control unit further comprises a small storage pocket coupled to the control unit, wherein the small storage pocket is configured as a pen holder.

2. The industrial truck according to claim 1, wherein the steering column portion is adjustable in at least one of an axial direction and a vertical direction.

3. The industrial truck according to claim 1, wherein the control unit comprises a storage compartment is a separate component from the control unit.

4. The industrial truck according to claim 3, wherein the storage compartment defines an opening which is spaced away from the steering column.

5. The industrial truck according to claim 1, wherein the small storage pocket is positioned on a side of the control unit distal from the steering column portion.

6. The industrial truck according to claim 1, further comprising a holder coupled to the control unit, wherein the holder is configured to accommodate a hand-held scanner.

7. The industrial truck according to claim 1, wherein the control unit is adjustably coupled to the steering column portion.

8. The industrial truck according to claim 1, wherein the control unit comprises an access authorization module.

9. An industrial truck comprising:
a drive system;
a steering arrangement comprising,
a steering column having a steering column portion extending along a steering column portion axis,
a steering wheel rotatably mounted on an end of the steering column portion, wherein the steering column portion is configured to adjust the steering wheel relative to a position of a driver; and
a control unit comprising a display module, wherein the control unit is coupled to a portion of the steering column such that the control unit extends from the portion of the steering column along an axis that intersects with the axis of the steering column portion, wherein the steering column portion comprises two shell parts divided in a longitudinal direction, and wherein a holding component for the control unit is coupled to one of the two shell parts.

10. The industrial truck according to claim 9, wherein the control unit is releasably coupled to the holding component.

11. The industrial truck according to claim 8, wherein the access authorization module comprises at least one of a lock, a reading device and a code input apparatus.

\* \* \* \* \*

UNITED STATES PATENT AND TRADEMARK OFFICE
CERTIFICATE OF CORRECTION

PATENT NO. : 10,850,761 B2
APPLICATION NO. : 16/253752
DATED : December 1, 2020
INVENTOR(S) : Sebastian Heusinger Page 1 of 1

It is certified that error appears in the above-identified patent and that said Letters Patent is hereby corrected as shown below:

In the Claims

Claim 3:
Column 4
Line 37, change "storage compartment is" to --storage compartment that is--

Signed and Sealed this
Eighth Day of June, 2021

Drew Hirshfeld
*Performing the Functions and Duties of the*
*Under Secretary of Commerce for Intellectual Property and*
*Director of the United States Patent and Trademark Office*